United States Patent Office 2,978,008
Patented Apr. 4, 1961

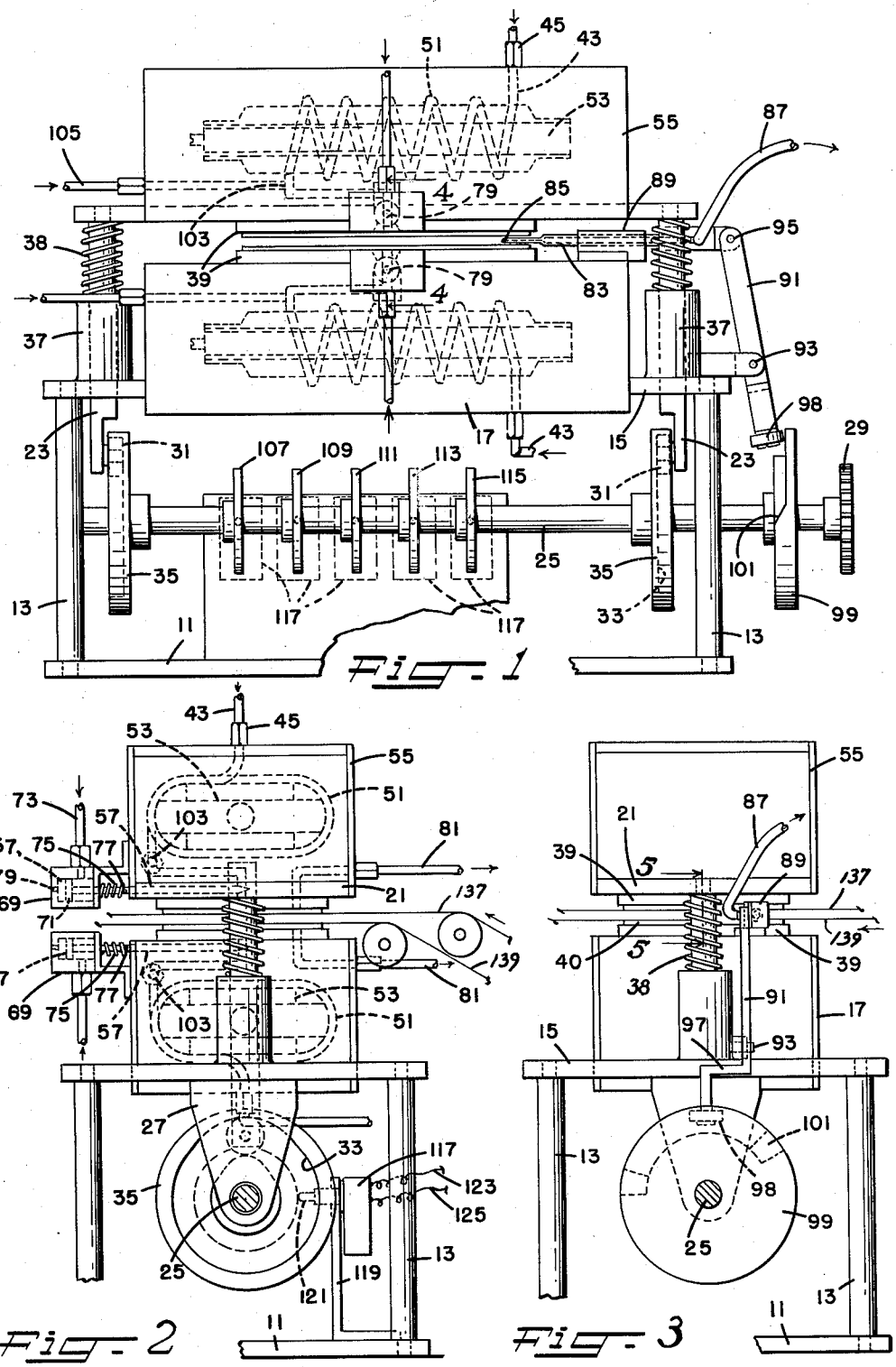

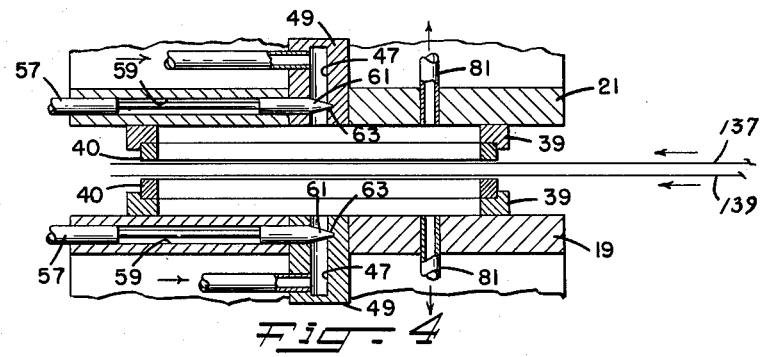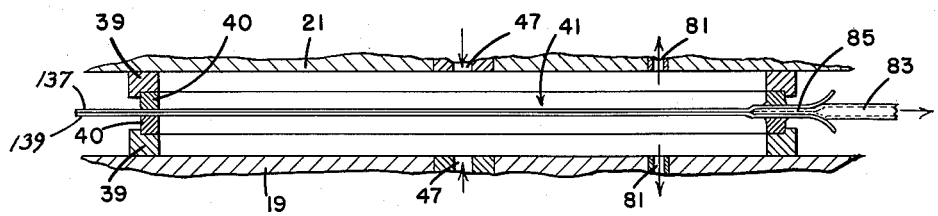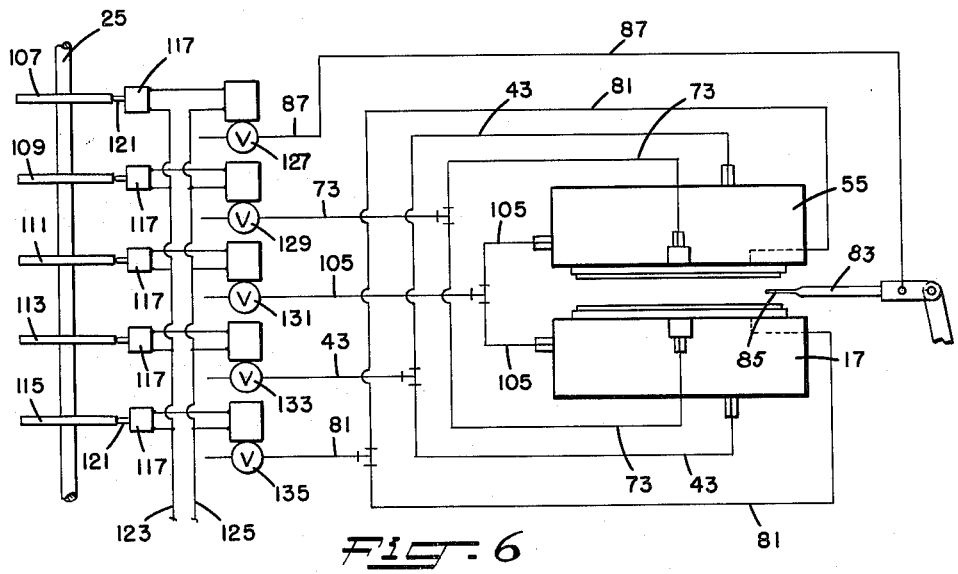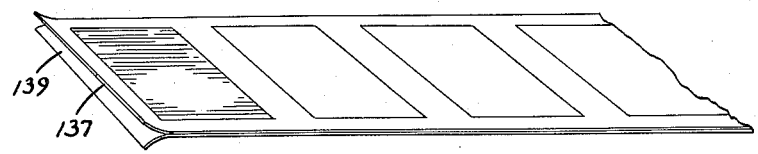

2,978,008

HEAT SEALING METHOD AND APPARATUS

John D. Conti, Elkins Park, Pa., assignor to American Viscose Corporation, Philadelphia, Pa., a corporation of Delaware Filed June 1, 1956, Ser. No. 588,685

15 Claims. (Cl. 154—42)

The invention relates to pressure sealing or welding of two or more sheets, films, or surfaces by means of a heated medium.

In attempting to weld two or more surfaces of inherently heat-sealable materials or materials to which heat-sealable properties have been imparted, considerable difficulty has been encountered both in manner of effecting the weld, and the resulting quality of the seal itself. While heated metal pressure plates have been employed to accomplish similar purposes, their use with materials of the above-noted nature is prohibited in view of the adhesive character the materials assume when heated. Attempts have been made to eliminate or reduce the tendency of the heat-sealable materials to stick to the heated pressure plates by coating the plates with known release or separation compositions, such as polytetrafluoroethylene (Teflon) but have proved to be unsatisfactory. Further, with the use of the conventional and known heated pressure plate technique, a uniform and tight weld or seal is not normally attained since extreme care must be exercised, both during manufacture and use, to insure that the sealing surfaces of the heated plates are smooth and even or true surfaces. Accordingly, an object of the present invention is to provide a generally new or improved and more satisfactory film or sheet sealing method and apparatus.

Another object is the provision of a method and apparatus for sealing or welding two or more sheets or films or surfaces of heat-sealable material or material having a heat-sealable coating by means of heated fluids.

Still another object is the provision of a method and apparatus for heat welding a plurality of surfaces together by enclosing the same within a heated fluid atmosphere while simultaneously exhausting the area between the surfaces.

A further object is to provide a method and apparatus for uniformly welding a plurality of surfaces together along a desired restricted area by subjecting the same to a heated gas under pressure to effect softening or plasticizing of the material which is subsequently set by a cooled gas.

A still further object is to provide an apparatus which is simple in use and construction, provides highly satisfactory results with minimum of supervision and at a rapid production pace, and can be readily adjusted to accommodate various materials and to provide different desired results.

These and other objects and advantages of the invention will be apparent from the following description and accompanying drawing in which:

Figure 1 is a front elevation of a portion of the apparatus of the present invention, with certain parts shown broken away;

Figure 2 is a right side elevation of apparatus shown in Figure 1, with certain parts being omitted;

Figure 3 is a view similar to Figure 2, illustrating the exhaust means for evacuating the air from the sealing area;

Figure 4 is a partial vertical section taken approximately on the line 4—4 of Figure 1;

Figure 5 is a partial vertical secttion taken approximately on the line 5—5 of Figure 3;

Figure 6 is a diagrammatic view illustrating the fluid control system for the various intake and exhaust members; and Figure 7 is a perspective view showing the resulting seals as formed along a continuous web.

In general, the invention relates to a method and apparatus for sealing or welding a plurality of sheets or films formed of heat-sealable materials, or materials having a heat-sealable coating or covering, by the use of heated fluids, preferably gases, under pressure. The portions of the sheets or films to be joined are supported, in a taut and overlapped relationship, within a closed chamber from which the normal atmosphere is exhausted simultaneously as heated fluid is admitted to the areas at opposite sides of the overlapped sheets or films. To insure uniform and close engagement of the sheets or films, the areas therebetween are evacuated. After a time interval sufficient to impart an adhesive character to the desired areas of the sheets or films, the heated fluid is exhausted from the chamber and is simultaneously replaced with a cool fluid which sets the weld or seal. A cam arrangement is utilized to secure the desired operational sequence of the various parts.

With reference to the drawing, the apparatus has a supporting framework including a base 11, a plurality of uprights 13 fixed to the base 11, and a stationary table 15 carried by the uprights 13. A rectangular hood 17, fixed to the table 15, supports at its upper end a fixed horizontal plate 19, while a similar plate 21 is supported for vertical movement toward and away from plate 19 by means of a pair of spaced rods 23. As hereinafter explained, the sequence of the various operations is controlled by means of a cam arrangement which includes a cam shaft 25 rotatably carried by the bearing plates 27 and driven through the gear 29 by any suitable means, not shown. Rollers 31, rotatably mounted on the lower ends of the rods 23, are adapted to ride along the cam track 33 formed in the disks 35 which are fixed to the shaft 25, and in this manner a vertical reciprocating movement is transmitted to the upper plate 21. Tubular bosses 37, fixed to the table 15, serve to guide the rods 23 along their vertical path, with compression springs 38 being interposed between each of the bosses 37 and the upper plate 21 to constantly urge the latter in an upward direction away from the plate 19.

As best seen in Figures 4 and 5, the plates 19 and 21 are each provided with a rectangular wall or shoulder 39 projecting toward and in aligned relationship with each other. A flexible and preferably resilient gasket or insert 40 of similar configuration and of heat resistant material, as for example silicone rubber, is bonded to each of the walls 39 and extend outwardly therefrom as illustrated. The walls 39 and their respective inserts 40 serve as jaws between which the sheets or films are gripped in a taut manner, as more fully explained hereafter, and together form a heating or sealing chamber 41 within which the heat welding of the materials occurs.

The delivery of a heated medium or fluid into the chamber 41, at opposite sides of the overlapped sheets or films, is accomplished by the conduits 43, each of which is connected at one end, as shown at 45, to a suitable fluid or gas supply source (not shown), while their opposite ends communicate with central passages 47 of the valve housings 49, fixed centrally of the plates 19 and 21 (see Figures 4 and 5) and opening into the chamber 41. The portion of each conduit 43 intermediate its ends is coiled, as shown at 51, about a conventional electrical heating unit 53 which is adapted to heat the fluid in the conduit 43 as it travels through its spiral path. The hood 17 encloses the heating unit 53 below the plate 19, while a similar hood 55 is disposed over the upper heating unit 53 to both contain the heat and to protect the operating personnel. Delivery of the heated fluid into the chamber 41 is controlled by the needle valves 57 slidably mounted within the openings 59 formed in the plates 19 and 21 and the valve housings 49 at substantially right angles and in intersecting relationship with the passages 47. As best seen in Figure 4, the inner end 61 of each of the needle valves 57 is of tapered or conical shape, with the wall of the housing 49 being similarly formed at 63 to insure a fluid-tight seal when the valves are in their closed position. The needle valves 57 pass through brackets 65, fixed to the hoods 17 and 55, and into the opening 67 of the bracket supported cylinder 69. The outer end of each of the valves 57 is provided with a circular disk 71 which is adapted to serve as a piston for retracting the valve as fluid under pressure is introduced by the conduit 73 into the cylinder 69 from a suitable source, not shown. Compression springs 75, encircling the valves 57 between the brackets 65 and pins 77, constantly urge the valves 57 into their closed position. The cylinders 69 are each provided with a vent 79 to permit the fluid to escape therefrom.

Exhausting of the chamber 41 is facilitated by the conduits 81 which pass through the plates 19 and 21 and open into the chamber 41. As more fully explained hereinafter, a cam arrangement is employed to maintain the exhaust conduits 81 open for a desired time interval simultaneously with the heated air delivery and after the sheets or films have been welded.

Since the overlapped sheets are gripped firmly between the resilient inserts or jaws 40, it is essential that the air trapped between the sheets or films be removed to insure a uniform and continuous weld. To accomplish this purpose, a vacuum shoe 83 is provided having at one end a flattened portion 85 adapted to extend between the sheets, while its opposite end is connected to suitable vacuum source (not shown) by the conduit 87. The vacuum shoe 83 is reciprocated horizontally within the bearing 89 to and from operative and inoperative positions by the lever 91, pivotally connected at 93 to the table 15 and at 95 to the vacuum shoe itself. The lower portion of the lever 91 is angulated as shown at 97 and is provided at its end with a roller 98 which rides along the contoured surface of the cam plate 99 fixed to the shaft 25. As the shaft 25 is rotated, the inclined surface 101 of the cam plates causes the lever 91 to swing clockwise as viewed in Figure 1, thereby retracting the vacuum shoe 83 outwardly from between the sheets which are then gripped at all points between the resilient inserts 40. Evacuating the area between the sheets occurs during the early stages of the sealing operation and thus the cam plate 99 is constructed so as to cause the vacuum shoe to be retracted before the sheets are actually sealed, and in this manner the entire areas of the sheets, as defined by the inserts 40, are sealed to each other. If desired, a spring may be employed to urge the lever 91 in a counter-clockwise direction as viewed in Figure 1 to insure proper engagement of the roller 98 with the cam plate 99. In the event more than two sheets or films are to be sealed to each other, additional vacuum shoes 83, of the construction described above, may be provided.

Once the overlapped sheets or films have been subjected to the heated atmosphere for a time interval sufficient to render the sheets adhesive, the supply of heated air is cut off and the sheets are allowed to cool to set the seal. However, it is preferred to introduce chilled air into the chamber 41 at opposite sides of the overlapped sheets to shorten the seal setting or stabilizing period. The needle valves 57 control the flow rate of the cool air which is introduced at 103 to the terminal portion of the conduits 43 by the conduits 105.

To control the sequence of operation of the various fluid delivery and exhaust members, there is provided a cam and valve arrangement which includes a series of plate cams 107, 109, 111, 113, and 115, fixed to the shaft 25. As shown in Figures 2 and 6, a micro-switch 117 is supported by a bracket 119 adjacent each of the plate cams with its spring urged contact 121 adapted to engage with the contoured peripheral surface of its respective cam. Electrical connections, indicated generally at 123 and 125, are provided between the micro-switches 117 and the electrically actuated valves 127, 129, 131, 133, and 135, in a manner as shown in Figure 6, which in turn control the fluid or air flow through the conduits 87, 73, 105, 43, and 81, respectively.

In operation, a pair of continuous webs, sheets, or films 137 and 139 are drawn from a suitable source (not shown) and disposed in overlapping relationship between the resilient gripping jaws as shown in Figures 1–4. The apparatus is then energized to turn the shaft 25, the rotation of which first causes the cams 35 to react against the rods 23 and lower the plate 21, against the action of the springs 38, into a position as shown in Figure 5, wherein the overlapped sheets are snugly gripped between the cooperating resilient jaws 40 in a taut manner and with the flattened portion 85 of the vacuum shoe 83 being interposed between the sheets. As the shaft 25 continues to rotate, the cams 107, 109, 113 and 115 simultaneously energize or open the valves 127, 129, 133, and 135, respectively, through the individual micro-switches 117. With the opening of valve 129, air is delivered through the conduit 73 into the cylinder 69 causing the needle valves 57 to be retracted from their positions shown in Figures 2 and 4, thereby allowing heated air or fluid, supplied through the open valve 133 and conduits 43, to enter the chamber 41 at opposite sides of the overlapped sheets. As the heated air is delivered into the chamber 41, the atmosphere existing therein at the start of operations is driven out through the conduits 81 and valve 135, which remain open for a relatively short interval sufficient to clear the air trapped in the sealing area. Simultaneously with heated air delivery, the air entrapped between the sheets is withdrawn by the vacuum shoe 83 and passes through the conduit 87 and the open valve 127. It will be noted that the vacuum force acting between the sheets combined with the pressure exerted on the sheets by the heated air insures that the entrapped air will be driven out in a relatively short time and that the sheets will uniformly contact each other along the entire area confined between the gripping jaws. The continued rotation of the shaft 25 moves the elevated surface of the cam 99 against the lower end of the lever 91 thereby retracting the vacuum shoe 83 from its position shown in Figures 1 and 5, as heretofore explained, and also turns the cam 107 to an ineffective position thereby de-energizing the valve 127.

The delivery of heated air under pressure into the chamber 41, as determined by the cams 109 and 113, is continued until the overlapped sheets assume an adhesive character and are welded to each other, after which the valve 133 is closed by the movement of the periphery of the cam 113 away from the adjacent micro-switch 117. At this time, the cams 111 and 115 come into operation energizing the valves 131 and 135 which allow cool air to pass into the chamber 41 through the conduit 105, and housing 49, and cause the heated air to escape therefrom through the conduit 81 and the open valve 135. This flow of cool air sets or stabilizes the seal or weld and is continued for a relatively short period. As the shaft 25 completes one revolution, the parts again assume their original or starting position with the upper jaw elevated. Since the apparatus of the present invention is designed for continuous operation, the continuous sheets or films 137 and 139 are each automatically advanced to position a new area between the gripping jaws and the above described operations are again repeated. It will of course be understood that the above noted vacuum and pressure forces, temperature, and time periods will depend upon factors such as the area to be sealed, the material, and the particular result sought, and of course may be varied as desired. Further, while air is preferred as the heating and cooling medium, other fluids may be utilized without departing from the spirit or scope of the invention.

The present invention is adapted to be applied to various uses and with different materials. For example, the method and apparatus may be employed for laminating sheets, sealing at spaced intervals a continuous tube or overlapped sheets which are subsequently cut into bags or packages, or as a testing device where the variables, such as pressure, temperature and time interval of the different operations are altered to study the effect, limitations, and ideal values when different heat-sealable films or films having heat-sealable coatings are employed. Heat-sealable films, such as polyethylene, and films such cellulose film coated with a heat-sealable material, may be welded in accordance with the method and apparatus of the present invention, and have been noted merely by way of example and not limitation.

It is seen from the above description that the objects of the invention are well fulfilled by the method and structure described. The description is intended to be illustrative only and it is to be understood that changes and variations may be made without departing from the spirit and scope of the invention as defined by the appended claims.

I claim:

1. A method of welding sheet materials having heat sealable properties including the steps of enclosing overlapped and contacting portions of the sheet materials within a fluid-tight chamber, evacuating the area between the contacting portions of said sheet materials disposed within said fluid-tight chamber, enveloping the contacting portions of said sheet materials disposed within said fluid-tight chamber with a heated fluid medium under pressure to seal the same, and removing the heating medium.

2. A method as described in claim 1 wherein said heating medium is air under pressure.

3. A method of sealing sheet materials having heat sealable properties including the steps of enclosing overlapped and contacting portions of the sheet materials within a fluid-tight chamber, evacuating the area between the contacting portions of said sheet materials disposed within said fluid-tight chamber, enveloping the contacting portions of said sheet materials disposed within said fluid-tight chamber with a heated fluid medium to seal the same, and cooling the contacting portions of said sheet materials to set the seal.

4. A method as described in claim 3 wherein said sealed portions of said sheet materials are cooled by a fluid medium under pressure.

5. A method as described in claim 3 wherein said sealed portions of said sheet materials are cooled by air under pressure.

6. A method as described in claim 3 wherein the atmosphere on opposite sides of said contacting portions of said sheet materials disposed within said fluid-tight chamber is allowed to escape and be replaced by said heated fluid medium concomitantly with the introduction of said heated medium.

7. A method of laminating a plurality of overlapped films having heat sealable properties including the steps of supporting the overlapped films in a taut suspended position within a fluid-tight chamber, removing the atmosphere between the suspended portions of the films, subjecting the overlapped films to a heated fluid medium to seal the same, and removing the heated medium to set the seal.

8. A method as described in claim 7 wherein said heated medium is introduced under pressure at opposite sides of said overlapped films.

9. Apparatus for sealing a plurality of overlapping sheet materials having heat sealable properties including a pair of similarly shaped members movable into engagement with opposite surfaces of overlapped sheet materials and together forming a fluid-tight chamber within which portions of the overlapped sheet materials are disposed, delivery means for introducing a heated fluid medium into said fluid-tight chamber to soften and seal the overlapped portions of the sheet materials disposed within said chamber, and exhaust means allowing said heated medium to escape from said fluid-tight chamber and permit said seal to set.

10. Apparatus as defined in claim 9 further including means for evacuating the area between the portions of the overlapping sheet materials disposed within said fluid-tight chamber.

11. Apparatus as defined in claim 9 further including means for introducing a cooling medium into said fluid-tight chamber concomitantly with the escape of the heated medium through said exhaust means.

12. Apparatus for welding a plurality of contacting heat sealable films including a chamber formed of a pair of similarly shaped members movable relative to each other and adapted to together form a substantially fluid-tight enclosure within which said plurality of films are supported, a heating element, a first conduit disposed adjacent to said heating element and opening into said chamber, said conduit being adapted to introduce into said chamber fluid heated by said element to seal the contacting portions of said films, a vacuum shoe opening outwardly of said chamber and adapted to project between the contacting portions of said films to evacuate the atmosphere therebetween, and a second conduit opening into said chamber and allowing the heated medium to escape and permit the seal to set.

13. Apparatus as defined in claim 12 including a first and a second valve at opposite ends of said first conduit, a third valve operatively connected to said vacuum shoe, a fourth valve associated with said second conduit, and control cams operatively connected with each of said valves whereby said first, second and third valves are concomitantly open when said fourth valve is closed and said fourth valve is open after said first, second and third valves are closed.

14. Apparatus as defined in claim 13 wherein said fourth valve is open momentarily during the introduction of the heated fluid into said chamber to allow the normal atmosphere to escape therefrom, and further including means for introducing a cooling medium through said second valve and into said chamber to set the seal after said first and third valves have been closed.

15. Apparatus as defined in claim 12 wherein a pair of first and second conduits are provided, each opening into said chamber at opposite sides, and further including means operatively connected with said vacuum shoe and adapted to move the same outwardly of said chamber before the films are sealed.

References Cited in the file of this patent

UNITED STATES PATENTS

| | | |
|---|---|---|
| 2,101,156 | Payne | Dec. 7, 1937 |
| 2,281,187 | Waters | Apr. 28, 1942 |
| 2,466,735 | Piazze | Apr. 12, 1949 |
| 2,621,704 | Langer | Dec. 16, 1952 |
| 2,638,964 | Andina | May 19, 1953 |
| 2,672,268 | Bower | Mar. 16, 1954 |
| 2,676,440 | Campbell | Apr. 27, 1954 |
| 2,723,789 | Schild | Nov. 15, 1955 |
| 2,749,686 | Lorenz et al. | June 12, 1956 |
| 2,786,511 | Reid | Mar. 26, 1957 |
| 2,859,796 | Taunton | Nov. 11, 1958 |

FOREIGN PATENTS

| | | |
|---|---|---|
| 490,298 | Canada | Feb. 3, 1953 |